United States Patent Office — 3,590,110, Patented June 29, 1971

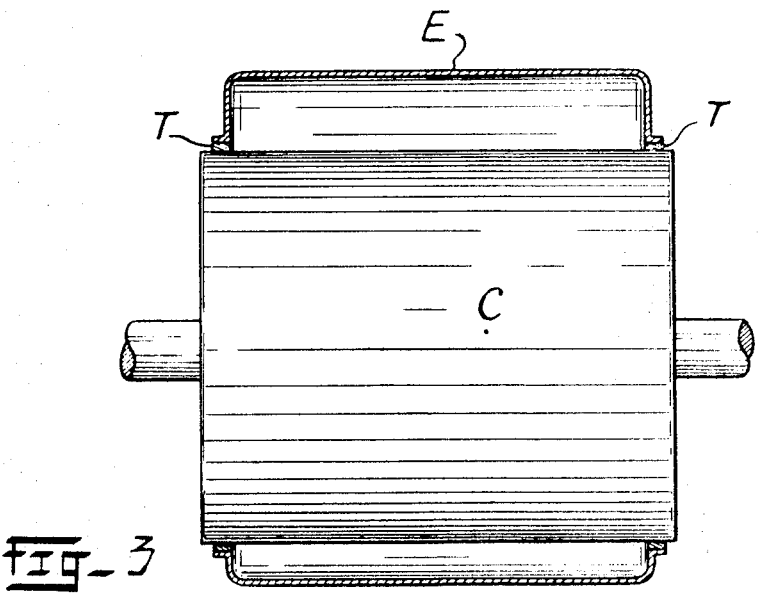
fig_3
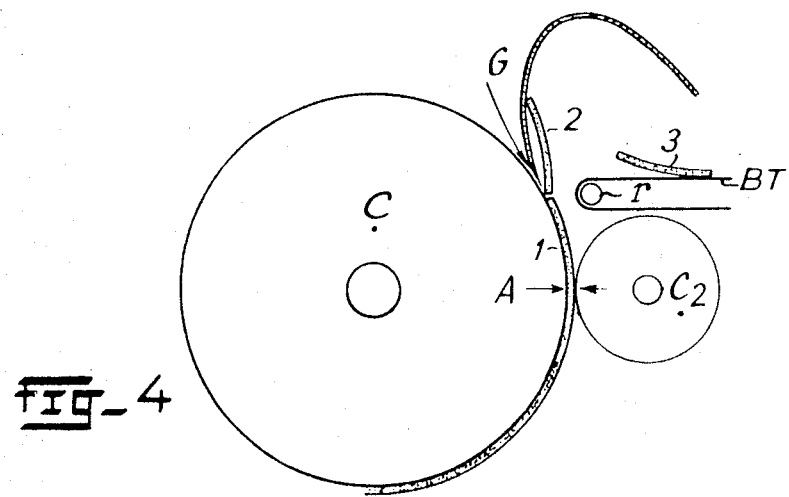
fig_4

3,590,110
PROCESS FOR THE PRODUCTION OF SOLIDIFIED TRIOXAN
Pierre Decitre, Bethune, France, assignor to Houilleres du Bassin du Nord & du Pas-de-Calais, Nord, France
Filed Oct. 17, 1967, Ser. No. 675,835
Claims priority, application France, Oct. 19, 1966, 80,563
Int. Cl. B29d 7/02; C07d 19/00; C08g 1/04
U.S. Cl. 264—212                                         5 Claims

ABSTRACT OF THE DISCLOSURE

Processes for producing solid trioxan in the form of oriented crystals which comprise continuously applying liquid trioxan at a temperature of 62° to 70° C. onto a cooling surface maintained at a temperature of 10° to 55° C. to solidify the trioxan and continuously removing the solidified trioxan, the surface being moved relative to the point of application of the liquid trioxan so that the trioxan which has solidified on the surface is not in contact with a considerable excess of hot liquid trioxan.

---

Figure 1:
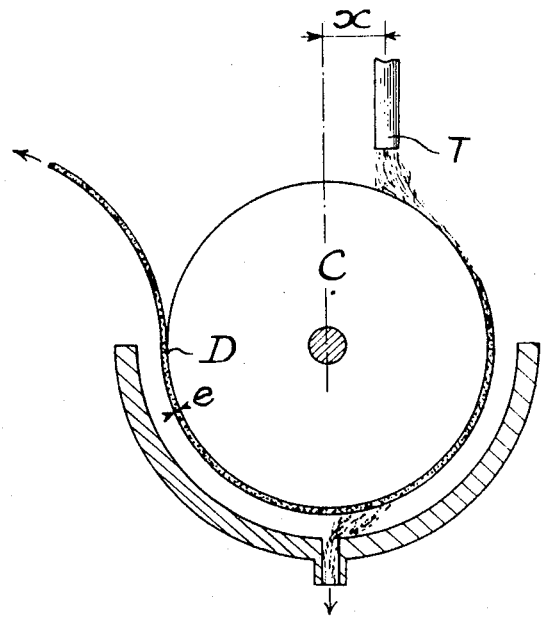

The present invention is concerned with a process for the production of solidified trioxan and with apparatus for carrying out the process.

Trioxan prepared by the polymerisation of formaldehyde is obtained, after purification, at a relatively high temperature in the form of a liquid having a very high vapour pressure. At room temperature trioxan is solid and it is, as a rule, stored and used in that form. However, since trioxan is very sensitive to impurities and has a very high vapour pressure, the operation of solidifying liquid trioxan is subject to considerable difficulties. Thus, there is no apparatus currently available which can be used for the continuous preparation of homogeneously crystallised relatively thick sheets of pure trioxan; at present a semi-continuous method is used in which the trioxan is crystallied in separately cooled tanks. However, this method is itself unsatisfactory since it gives an inadequate yield for the preparation of large quantities of solid trioxan and the crystalline structure of the resulting product is generally inhomogeneous.

We have now developed a continuous process for solidifying and crystallising liquid trioxan and, according to the present invention, we provide a process which comprises continuously applying liquid trioxan at a temperature of from 62 to 70° C. on to a cooling surface maintained at a temperature of from 10 to 55° C., the surface being moved relative to the point of application of the liquid trioxan so that the trioxan which has solidified on the surface is not in contact with a considerable excess of hot liquid trioxan, and continuously removing the solidified trioxan from the surface.

By means of this process, sheets of solidified trioxan can be obtained in which the trioxan crystals have satisfactory dimensions and an identical orientation (the main axes of the crystals being perpendicular to the surface of the sheet). The cooling surface is advantageously the curved surface of a rotating polished metal cylinder; the liquid trioxan is preferably applied adjacent the upper or top generator of the cylinder and can be applied at other points on the surface of the cylinder, particularly adjacent the lower or bottom generator. Excess liquid trioxan, i.e. trioxan which does not solidify on the surface, is prferably re-cycled.

A considerably difficulty encountered in the crystallisation of trioxan is the fact that the solidefied trioxan tends to adhere to the cooling surface to which it is applied. It is therefore very advantageous to employ a crystallisation method in which the solid trioxan can be readily detached from the cooling surface. This is surprisingly achieved in the process according to the invention by controlling the temperature of the cooling surface, which must always be below 55° C. Under these conditions, using a cooling surface as disclosed hereinbefore, solid trioxan can be obtained which is readily detached from the surface on which it has formed. If the cooling surface is at a temperature below 10° C., the solidified trioxan is obtained as a relatively thick layer composed of very small crystals without preferential orientation.

The temperature of the liquid trioxan poured on to the cooling surface is from 62 to 70° C. Trioxan melts at 62° C.; the upper limit of 70° C. is set by the likelihood of the trioxan being contaminated with various impurities at higher temperatures and by the rate of heat transfer between the trioxan and the cooling surface in relation to the crystallisation speed of the trioxan.

The present invention also includes apparatus for carrying out the above-described process, the apparatus comprising a rotatable polished metal cylinder provided with cooling means, a jacket surrounding the curved surface of the cylinder, the jacket having side walls which bear against the curved surface of the cylinder, and means positioned between the jacket and the cylinder for applying liquid trioxan to the curved surface of the cylinder.

The jacket is preferably double walled and provided with means for circulating a heating medium therethrough. The inner edges of the side walls of the jacket are preferably provided with sealing elements which bear against the curved surface of the cylinder, the sealing elements being provided with heating means.

In a particular embodiment of the apparatus, the solidified trioxan is detached from the cylinder and broken into uniformly sized small sheets by the combination of a cylinder which bears against the solidified trioxan on the cooling cylinder and a curved metal element extending across the width of the cylinder, this element being shaped to detach the solidified trioxan from the cooling cylinder and to deliver it to a suitably positioned conveyor belt.

The diameter of the cooling cylinder and its speed of rotation are also important factors in obtaining homogeneous solid trioxan. These parameters also affect the rate of production of solid trioxan since the larger the cylinder and the faster it rotates, the greater the production of solid trioxan. The trioxan must have an adequate crystallisation time and the speed of rotation of the cylinder must be adapted to its diameter. For example, the speed of rotation of a cylinder having a radius of 14 cm. is suitably from ⅓ and ⅒ of a revolution per minute.

Figure 2:
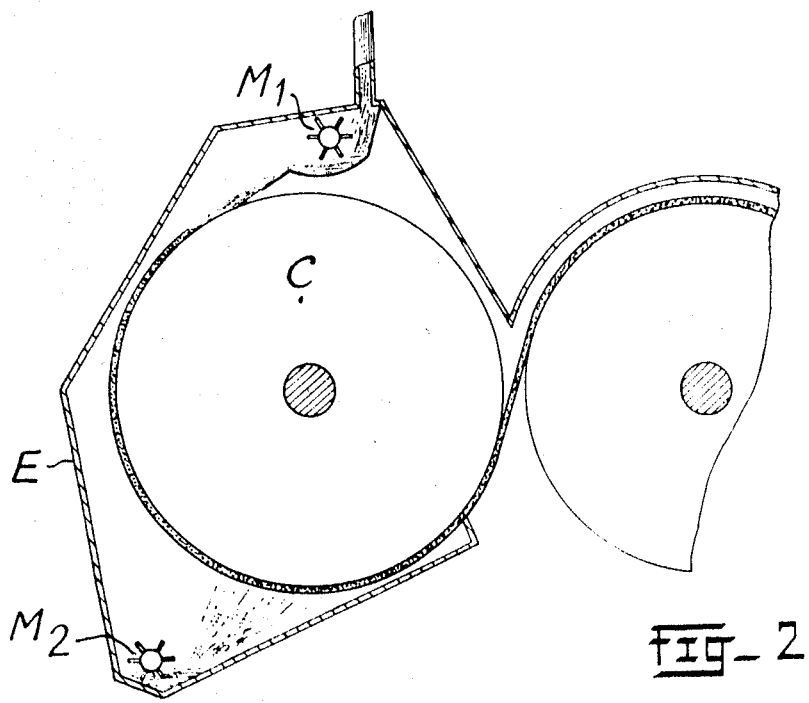

In order that the invention may be more fully understood, suitable forms of apparatus for carrying out the process, and their methods of operation, will now be described, by way of example only, with reference to the accompanying drawings in which:

FIG. 1 is a diagrammatic end elevation of a first apparatus;
FIG. 2 is a diagrammatic sectional elevation of a second apparatus;
FIG. 3 is a diagrammatic side elevation, partly in section, of the apparatus of FIG. 2; and
FIG. 4 is a diagrammatic end elevation of solidified trioxan collecting means.

Referring to FIG. 1, the apparatus comprises an internally water cooled rotatable stainless steel cylinder C and a delivery pipe T for liquid trioxan spaced a distance $x$ from the top generator of the cylinder C; the delivery pipe can be reciprocated across the width of the cylinder. Positioned below the cylinder C is a semi-cylindrical collecting trough provided with an outlet for excess liquid trioxan. During operation a layer of solidified trioxan having a thickness $e$ is formed on the cylinder and is detached therefrom at the point D.

A number of runs were carried out using apparatus as shown in FIG. 1 and these are described in Example 1.

EXAMPLE 1

In carrying out the runs, the temperature of the cylinder C was maintained at a constant value of 23° C. The cylinder had a diameter of 28 cm. and its rate of rotation was varied from ⅔ to ⅙ of a revolution per minute. The liquid trioxan was delivered at a temperature of 64° C.

The rate of supply of liquid trioxan and the recycle rate (excess of liquid trioxan supplied over solid trioxan recovered) were varied as between the different runs.

The variations in the operating conditions and the results obtained were as follows:

TABLE 1

| Distance $x$, in cm. | Rate of supply of liquid trioxan $a$, in g./min. | Recycle rate $r$, in g./min. | Speed of rotation, r.p.m. | Thickness $e$, in mm. |
|---|---|---|---|---|
| 2.5 | 118 | 48 | ⅙ | 5 |
| 2.5 | 280 | 150 | ⅙ | 5.3 |
| 2.5 | 460 | 360 | ⅙ | 4.5 |
| 0 | 200 | 60 | ⅙ | 5.3 |
| 0 | 265 | 105 | ⅙ | 5.9 |
| 0 | 265 | 105 | ⅓ | 4.1 |
| 0 | 265 | 105 | ⅔ | 3 |
| 11 | 190 | 90 | ⅙ | 4 |

The following facts were ascertained from these runs: When the ratio $r/a$ (ratio between the recycle rate and the supply) is lower than 0.4, the solid trioxan obtained is not uniform and its surface has rather large crystallites; when $$0.4 < \frac{r}{a} < 0.5$$

the trioxan layer formed becomes continuous and more regular, but its outer surface looks bumpy and its internal surface has a crystalline structure different from the crystalline structure of the body; when $r/a > 0.5$, the faults mentioned above disappear and when the resulting solid trioxan is polymerised after irradiation, a crude polyoxymethylene of homogeneous structure can be obtained.

Although the apparatus of FIG. 1 can be used for carrying out the process according to the invention, it has a number of disadvantages, as follows: there is difficulty in supply via the delivery pipe T leading to a band of trioxan of rather irregular thickness; the unprotected hot trioxan is easily contaminated; the liquid trioxan has to be recycled at a high rate; there is a considerable loss of trioxan due to its high vapour pressure and there is the risk of fouling the ends of the cylinder.

A preferred form of apparatus is shown in FIGS. 2 and 3. This apparatus comprises a rotatable internally water cooled cylinder C of molybdenum-containing 18,8 stainless steel and a double walled jacket E which substantially completely surrounds the curved surface of the cylinder but leaves its ends open to the air (as shown in FIG. 3). Means (not shown) are provided for circulating a heating medium through the jacket E and the side walls of the jacket are provided with hollow sealing elements T (see FIG. 3) through which a heating medium can be passed.

Opening into the top of the jacket E is a delivery pipe for liquid trioxan which leads to a trough positioned between the jacket E and the top of the cylinder C and extending across the width of the jacket. Positioned in the trough, and extending along its length, is a rotatable impeller $M_1$. When the trough contains liquid trioxan and the impeller is rotated, the vanes of the impeller project the liquid trioxan on to the top of the cylinder adjacent the top generator thereof. The bottom of the jacket E forms another trough in which is positioned a second impeller $M_2$; when excess liquid trioxan collects at the bottom of the jacket and the impeller $M_2$ is rotated, its vanes project the liquid trioxan on to the cylinder adjacent the lower generator thereof.

In operation the jacket E is maintained at a temperature such that trioxan vapour cannot condense on its inner surface and the sealing elements T are maintained at a temperature 2 or 3° C. higher than that of the jacket E. The band of solidified trioxan is formed, at a controlled temperature, only on the curved surface of the cylinder without the ends of the cylinder becoming dirtied; trioxan vapour cannot condense on the internal surface of the jacket since it is always kept at an adequate temperature; the band of solidified trioxan is insulated from the side walls of the jacket by a thin film of molten trioxan which forms in contact with the sealing elements T whose temperature is controlled. This device substantially eliminates fricton and adheson between the band of solid trioxan and the edges of the side walls of the jacket and thus prevents the premature tearing away of the solid trioxan from the surface of the cylinder.

A series of runs were carried out using apparatus as shown in FIGS. 2 and 3 and these are described in Example 2.

EXAMPLE 2

In carrying out the runs, the surface temperature of the cylinder C was maintained at 23° C. The cylinder had a diameter of 28 cm. and it was rotated at rates varying from ⅓ to ⅙ of a revolution per minute. The liquid trioxan was delivered at a temperature of 64° C.

The variations in the operating conditions and the results obtained are shown in Table 2.

TABLE 2

| Rate of supply of liquid trioxan $a$, in g./min. | Recycle rate $r$, in g./min. | Speed of rotation, in r.p.m. | Thickness $e$ of solid trioxan, in mm. |
|---|---|---|---|
| 140 | 16 | ⅙ | 4.8 |
| 185 | 20 | ⅓ | 3.4 |

The best results, as regards both the exteral appearance of the band of solid trioxan and its homogeneity of crystallisation, were obtained with a ratio $r/a$ of from 0.05 to 0.15. The use of the apparatus shown in FIGS. 2 and 3, as compared with that shown in FIG. 1, makes the supply of liquid, trioxan to the cylinder much more homogeneous and the band of solid trioxan has a highly uniform thickness; the trioxan is no longer contaminated and the recycling rate of liquid trioxan is low.

If the solid trioxan is to be collected in the form of individual small sheets of substantially constant width, the apparatus shown in FIGS. 2 and 3 is provided with an extra device as shown in FIG. 4.

Referring to FIG. 4, the apparatus additionally comprises a rotatable stainless steel cylinder $C_2$, the spacing of which from the cylinder C can be varied and which is adapted to bear against the band of solidified trioxan on cylinder C at point A; a conveyor belt BT, suitably of rubberised canvas, which passes over a roller $r$, which is suitably faced with stainless steel; and a guide blade G formed from a sheet of stainless steel and disposed as shown in the figure. The guide blade extends across the width of the cylinder G and its edge adjacent the latter, which is preferably tapered, is positioned close to, but not in contact with, the surface of the cylinder; the guide blade G cannot, therefore, scratch the surface of the cylinder, but its edge is close enough to the surface to deflect the band of solid trioxan from the cylinder C.

In operation, pressure is applied to the solidified trioxan by the cylinder $C_2$ which is rotated so that its linear peripheral speed is the same as that of the band of trioxan, and when the band of solid trioxan comes into contact with the edge of the guide G, the band is deflected from the cylinder C and breaks at the level A. On further rotation, the detached sheet of solid trioxan is moved upwards and progessively outwards from the cylinder C until it falls onto the conveyor BT. Referring to FIG. 4, the individual sheets pass progressively from position 1 to positions 2 and 3.

The operation of the process accordng to the invention using the apparatus described enables a band and/or small sheets of solid trioxan to be obtained of high purity and high crystalline homogeneity throughout. The thickness of the trioxan band can be regulated as required, it being preferred to obtain a thickness of from 2 to 8 mm.

The solid trioxan thus prepared can be packed and sold for all uses. It can be directly used as a monomer for the preparation of polyoxymethylene by known methods, more particularly by irradiation and polymerisation in the solid phase, the outstanding crystalline homogeneity of the solid trioxan enabling homogeneous polyoxymethylenes of very high molecular weight to be obtained in a readily reproducible manner.

I claim:

1. A process for the production of solidified trioxan, which comprises continuously applying liquid trioxan at a temperature of from 62 to 70° C. onto a cooling surface maintained at a temperature of from 10 to 55° C., the surface being moved relative to the point of application of the liquid trioxan so that the trioxan which has solidified on the surface is not in contact with a considerable excess of hot liquid trioxan while controlling the speed of the cooling surface to provide sufficient time for crystallization of the trioxan into crystals possessing satisfactory dimensions and substantially identical orientation and so that the thickness of the solidified trioxan is from about 2 to 8 mm., and continuously removing the solidified trioxan from the surface.

2. A process according to claim 1, in which liquid trioxan is applied to the cooling surface at substantially twice the rate at which solidified trioxan is removed.

3. A process according to claim 1, in which the cooling surface is the curved surface of a rotating cylinder, liquid trioxan being applied adjacent the top generator of the cylinder and adjacent its lower generator.

4. A process according to claim 3, in which trioxan is applied to the cylinder at a rate which is from 5 to 15% greater than the rate at which solidified trioxan is removed.

5. A process according to claim 3 in which the cooling surface is the curved surface of a rotating cylinder and the liquid trioxane is applied adjacent the top generator of the top cylinder.

References Cited

UNITED STATES PATENTS

| | | | |
|---|---|---|---|
| 2,351,271 | 6/1944 | Leguillon | 264—216 |
| 2,465,489 | 3/1949 | Sokol | 260—340 |
| 2,654,125 | 10/1953 | Hall | 264—212 |
| 2,688,155 | 9/1954 | Nadeau et al. | 264—212 |
| 3,001,235 | 9/1961 | Komiyama et al. | 260—67 |
| 3,231,543 | 1/1966 | Jamison | 260—67 |

FOREIGN PATENTS

| | | | |
|---|---|---|---|
| 969,185 | 9/1964 | Great Britain | 260—340 |

ROBERT F. WHITE, Primary Examiner

J. R. THURLOW, Assistant Examiner

U.S. Cl. X.R.

204—159.21; 260—67, 340; 264—330